United States Patent [19]

Simon

[11] 4,323,398
[45] Apr. 6, 1982

[54] PERFORMING MAINTENANCE OPERATIONS ON HEAT EXCHANGER TUBE BUNDLES

[76] Inventor: Andrew Simon, Roadmeetings, Carluke, ML84QQ Lanarkshire, Scotland

[21] Appl. No.: 137,965

[22] Filed: Apr. 7, 1980

[51] Int. Cl.³ .............................................. B08B 7/04
[52] U.S. Cl. ...................................... 134/18; 134/33; 414/746
[58] Field of Search ..................... 134/18, 33; 414/746

[56] References Cited

U.S. PATENT DOCUMENTS

| | | | |
|---|---|---|---|
| 3,052,245 | 9/1962 | Nagle | 134/33 X |
| 3,060,064 | 10/1962 | Zingg | 134/33 X |
| 3,069,141 | 12/1962 | Broussard | 414/746 X |
| 3,214,867 | 11/1965 | Henning | 134/33 X |
| 3,239,077 | 3/1966 | Huff et al. | 414/746 |
| 3,458,063 | 7/1969 | McQuerry et al. | 414/746 |
| 3,510,012 | 5/1970 | Meteren | 414/746 |
| 4,227,854 | 10/1980 | Coffey | 414/746 |

Primary Examiner—Marc L. Caroff
Attorney, Agent, or Firm—Cushman, Darby & Cushman

[57] ABSTRACT

The tube bundle is moved out of its shell utilizing a frame structure having a number of movable trollies associated therewith for supporting the tube bundle at spaced points along the length thereof, the trollies having rollers disposed on opposite sides of the central axis of the tube bundle. The tube bundle supported by the trollies is horizontally moved off of the frame structure by rolling the trollies off of the frame structure, preferably onto a protector, and then can be moved to desired maintenance stations. The trollies are latched into place on the protector for movement from station to station. The tube bundle can be transferred from the trollies to a second set of trollies for effecting rotation of the tube bundle about its central axis at the same time that washing fluid is sprayed thereon, and the tube bundle while supported by the trollies may be moved off the protector into an automated cleaning system. Interlocks may be provided preventing movement of the protector without the carriages being properly latched in place.

14 Claims, 12 Drawing Figures

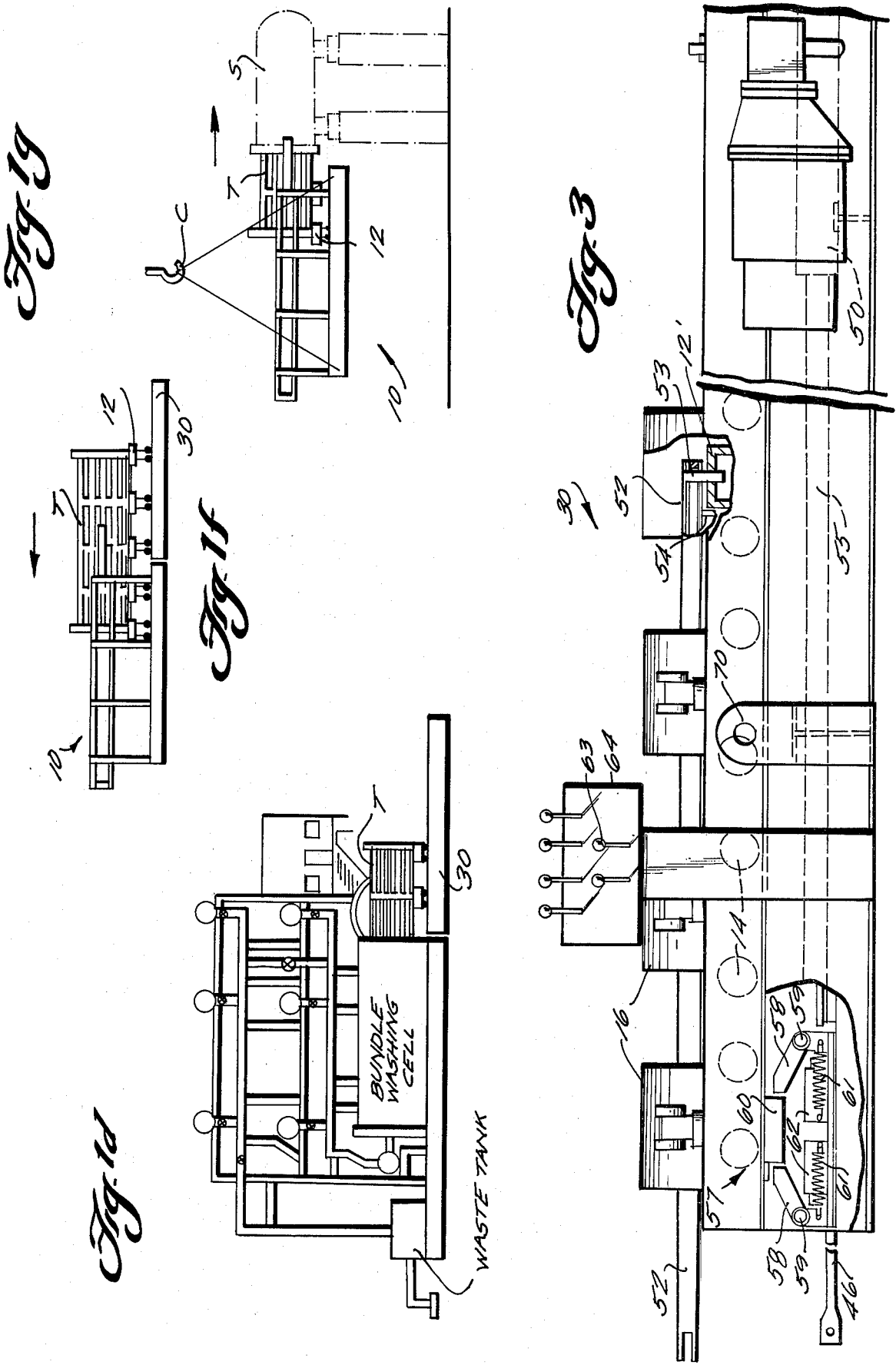

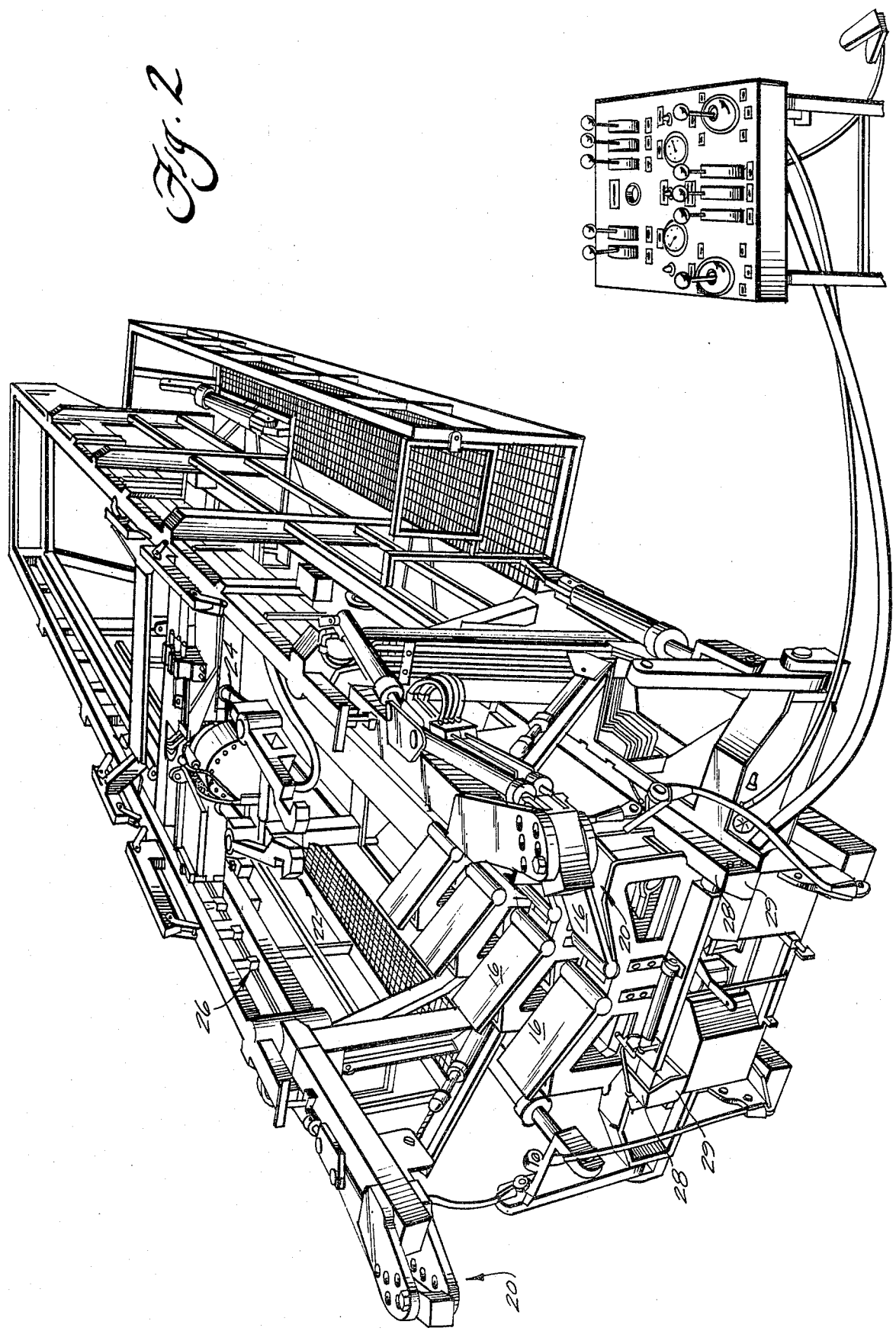

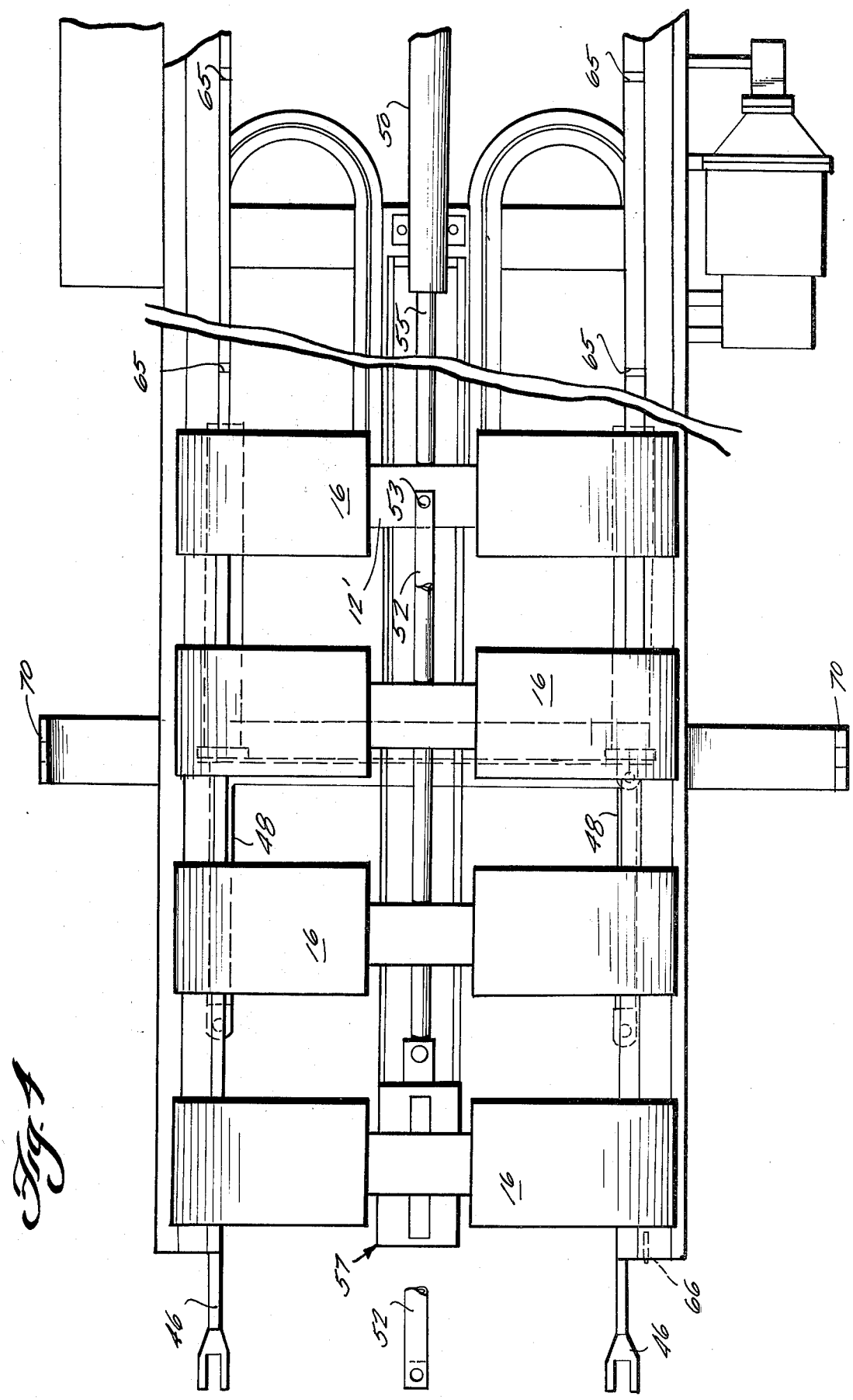

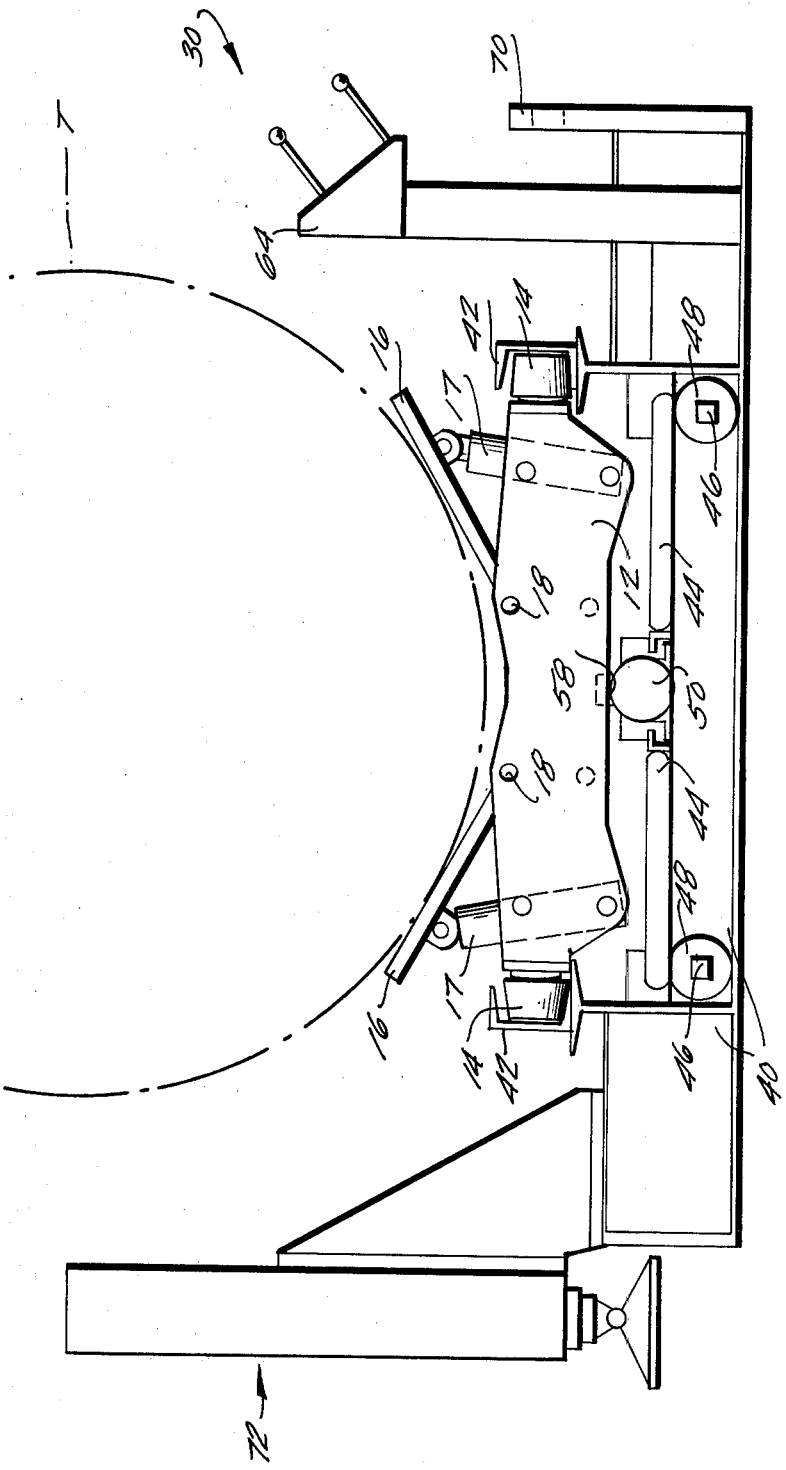

PERFORMING MAINTENANCE OPERATIONS ON HEAT EXCHANGER TUBE BUNDLES

BACKGROUND AND SUMMARY OF THE INVENTION

The invention relates to a method and apparatus for facilitating movement of a heat exchanger tube bundle between various maintenance stations after removal of the heat exchanger tube bundle from the heat exchanger shell. In the past, either the heat exchanger tube bundle withdrawal apparatus itself is utilized for moving the removed heat exchanger tube bundle from one maintenance station to another (such as shown in U.S. Pat. No. 3,458,063), or slings have been utilized either for moving the removed bundle to a separate movable support for subsequent transfer to cleaning operations (see U.S. Pat. No. 3,958,698), or for lifting the tube bundle from one maintenance station to another. While the necessary end results can be achieved with such prior systems, there are drawbacks associated therewith. For instance, when the extraction mechanism itself it utilized for moving the tube bundle between maintenance stations, compromises must be made in its design that can adversely affect its ability to perform its primary withdrawal function, and the entire apparatus is tied up the entire time a single tube bundle is being cleaned or repaired. Where slings are utilized, such slings can, and often do, result in damage to the heat exchanger tube bundles, requiring further repair thereof.

According to the present invention a method is provided for performing maintenance operations on a heat exchanger tube bundle that eliminates many drawbacks associated with prior systems, and in general provides for quick, safe, and effective handling and maintenance of heat exchanger tube bundles between the withdrawal and re-insertion operations. The invention also contemplates an apparatus facilitating practice of the method. The primary focus of the method according to the invention is the provision of movable trollies which are provided beneath the tube bundle at predetermined spaced points along the length thereof to support the weight thereof during the extraction operation, and the utilization of such same trollies to move the tube bundle off of the frame structure and subsequently onto desired maintenance stations.

The present invention contemplates a method for performing maintenance operations on a heat exchanger tube bundle mounted in a heat exchanger shell utilizing an extracting and inserting apparatus including a frame structure having a plurality of movable trollies supported for movement therewith and for supporting the tube bundle at spaced points along the length thereof, the trollies having rollers disposed on opposite sides of the central axis of the tube bundle. The method comprises the following steps: (a) Linearly moving the tube bundle to pull it out of the heat exchanger shell onto the frame structure. (b) Providing the trollies beneath the tube bundle at predetermined spaced points along the length thereof in engagement therewith to support the weight of the tube bundle. (c) Moving the frame structure with supported tube bundle to a supported position wherein the central axis of the tube bundle is substantially horizontal. (d) Rolling the trollies, with supported tube bundle, off of the frame structure by moving the tube bundle horizontally with the trolley rollers rolling along a stationary horizontal support. (e) Moving the tube bundle while still supported by the trollies to desired maintenance (e.g. cleaning and/or repair) stations at which maintenance operations are performed on the tube bundle while still supported by the trollies. (f) Rolling the trollies supported by the tube bundle back onto the frame structure while the frame structure is in a horizontal position. (g) Moving the frame structure into operative association with the heat exchanger shell; and (h) Linearly moving the tube bundle off of the frame structure into the heat exchanger shell.

Preferably the rolling step is practiced by rolling the movable trollies onto a protector, the protector including a platform that is horizontal and has a trolley support structure vertically coincident with a trolly support structure of the frame structure. The method preferably consists essentially of such steps, whereby the tube bundle never is supported by slings, with the steps being performed substantially sequentially. The maintenance station moving step may include moving the tube bundle to a washing station and spraying washing fluid onto the tube bundle while it is being rotated about its central axis, and to accomplish this the tube bundles may be transferred from the movable trollies to a second set of movable trollies, the movable trollies of the second set effecting the rotation of the bundle. The movable trollies are latched into position onto the protector platform so that no relative movement therebetween is possible, and preferably an alignment structure is provided for aligning the protector with the frame structure. The protector and the frame structure are aligned just before rolling of the trollies onto or off of the frame structure, and disconnection of the alignment structure from between the protector and the frame structure is positively prevented by control interlocks until the latching step is accomplished. The maintenance steps may be further accomplished by transferring the tube bundle while supported by the trollies off of the protector and into an automated cleaning system. Movement between stations can be accomplished by lifting the entire protector with a crane, or by jacking the protector platform off the ground and disposing a mobile apparatus underneath it.

The protector apparatus for use in facilitating practice of the method according to the invention includes a platform including a guide structure associated therewith corresponding to the guide structure of the frame structure, and being long enough to support all of the trollies associated with the frame structure when they support a tube bundle thereon; and means for facilitating movement of the platform from one maintenance station to another. Means are associated with the protector for positively aligning it with a frame structure, for effecting latching of the movable trollies onto the platform, and for interlocking the latching and alignment structures to prevent disconnection of the alignment structure until the latching means effect latching of the trollies onto the platform. A linear force exerting structure may also be associated with the protector for moving the tube bundle supported by the trollies off the protector into an automated cleaning system or the like.

Suitable frame structures for insertion and removal of heat exchanger tube bundles into and from a heat exchanger shell that are utilized in practicing the present invention are disclosed in copending application Ser. No. 923,443 filed July 10, 1978, now U.S. Pat. No. 4,227,854, and U.S. Application Ser. No. 102,983 filed by John B. C. Davies entitled "CORE EXTRACTION AND INSERTION APPARATUS", on Dec. 11, 1979, the disclosure of both of said applications being incorporated by reference herein.

It is the primary object of the present invention to provide a simple, safe, and effective method and apparatus for practicing maintenance operations on a heat exchanger tube bundle while removed from a heat exchanger shell. This and other objects of the invention will become clear from an inspection of the detailed description of the invention and from the appended claims.

BRIEF DESCRIPTION OF THE DRAWINGS

FIGS. 1a through 1g are schematic representations illustrating the step-by-step practice of an exemplary method according to the present invention;

FIG. 2 is a perspective view of an exemplary frame structure apparatus with which the apparatus according to the present invention is compatible for practicing the method according to the invention;

FIGS. 3 and 4 are side and top plan views respectively of an exemplary protector apparatus according to the invention, with portions cut away in FIG. 3 for clarity;

FIG. 5 is an end view of one embodiment of an exemplary protector apparatus according to the present invention.

DETAILED DESCRIPTION OF THE DRAWINGS

Figure 1A:
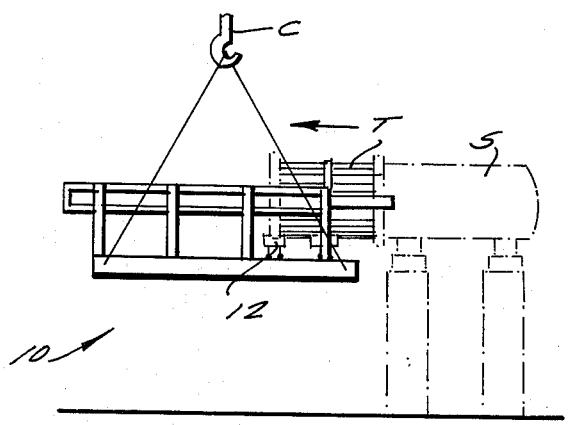

FIGS. 1a through 1g illustrate the step-by-step practice of an exemplary method according to the present invention. The method is performed utilizing an extracting and inserting apparatus illustrated generally at 10 for extracting a heat exchanger tube bundle T from, and inserting it into, a heat exchanger shell S. The extracting apparatus 10 comprises a frame structure including a plurality of movable trollies 12 supported for movement therewith and for supporting the tube bundle T at spaced points along the length thereof. The trollies 12, which can be best seen in FIGS. 2, 5, and 6, have rollers 14 disposed on opposite sides of the central axis of the tube bundle T supported thereby. Preferably, the movable trollies 12 also include a pair of individually adjustable leaves 16 operated by pneumatic cylinders 17 or the like and pivotal about pivot points 18 so that they can be moved between positions supporting, not supporting, or supporting in different manners the tube bundle T.

The frame structure 10 and movable trollies 12 are described in more detail in co-pending application Ser. No. 923,443 filed July 10, 1978, now U.S. Pat. No. 4,227,854, and Ser. No. 102,983 filed Dec. 11, 1979 by John B. C. Davies and entitled "CORE EXTRACTION AND INSERTION APPARATUS", the disclosure of both of which applications is hereby incorporated by reference herein. Simply, however, the frame structure 10 includes movable clamp elements 20 for connecting and locking the frame structure 10 to the heat exchanger shell S, a movable structure 22 mounted for movement along the frame structure 10 with respect to the shell S; a force exerting structure 24 for exerting a force on the movable structure to move it toward and away from the shell; and thrust surfaces 26 associated with the frame structure for cooperating with the force exerting means to effect unidirectional movement of the movable structure 22 with respect to the frame structure 10. A pair of channels 28 receive the rollers 14 along three sides thereof and guide the movement of the rollers 14 along the frame structure 10, the front ends of the channels 28 having readily removable end caps 29 for blocking movement of the rollers 14 out of the front ends of the channels 28. When the end caps 29 are removed, the trollies 12 may readily be rolled out of the frame structure 10.

Figure 1B:
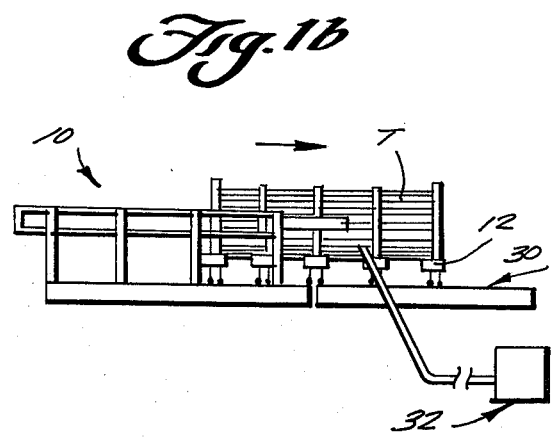

In practicing the exemplary method according to the invention illustrated in FIGS. 1a through 1g, the tube bundle T is linearly moved out of the heat exchanger shell S onto the frame structure 10. The trollies 12 are provided beneath the tube bundle T at predetermined spaced along the length thereof and in engagement therewith to support the weight of the tube bundle T. The frame structure 10 is then moved, as with crane C, to a supported position (e.g. on the ground) wherein the central axis of the tube bundle T is substantially horizontal, as illustrated in FIG. 1b. Then the trollies 12 are rolled off of the frame structure 10, with the supported tube bundle T, by moving the tube bundle T horizontally as illustrated in FIG. 1b. Preferably this step is accomplished by rolling the trollies 12 with supported tube bundle T onto a protector, illustrated generally at 30.

Figure 1C:
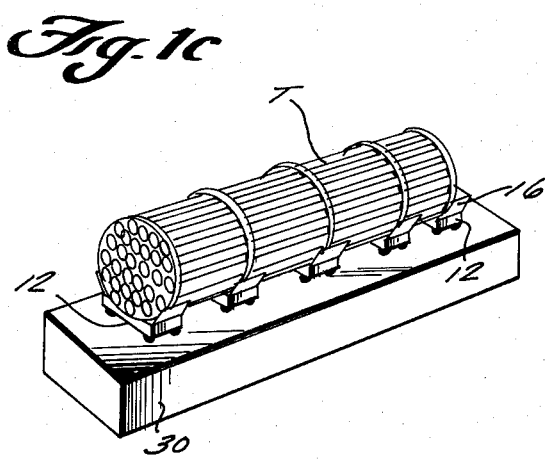
Figure 1E:
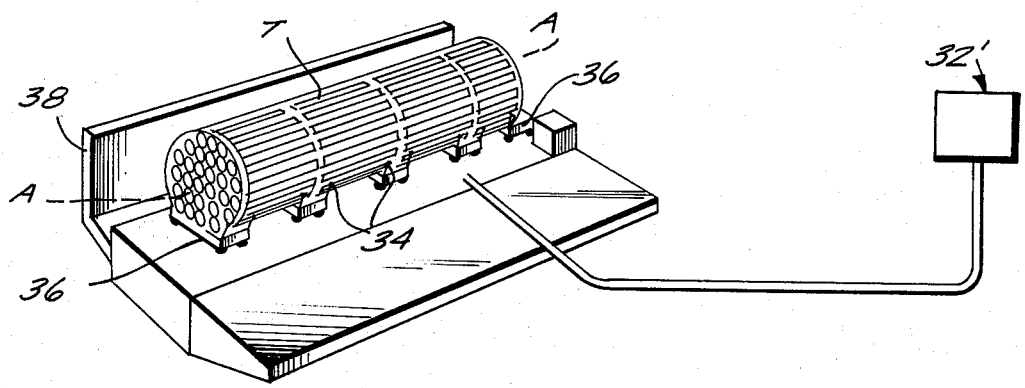

While supported by the protector 30, as illustrated schematically in FIG. 1c, the tube bundle T can be moved to various maintenance stations. For instance as illustrated in FIG. 1b, it can be subjected to the cleaning action of a HUSKY water jet unit 32 which sprays water driven by a high pressure water pump driven by a prime mover with an infinitely variable hydrostatic transmission train, the pump being capable of supplying flows up to 40 gallons per minute and pressures up to 10,000 psi. In FIG. 1c the tube bundle T is positioned at a repair station wherein various repair operations (i.e. bending, replacement, etcetera) can be performed on the individual tubes of the tube bundle T. In FIG. 1d the tube bundle T is being shown moved into operative association with an automated bundle cleaning system. In FIG. 1e the tube bundle T is shown being supported by powered rollers 34 of a second set of movable trollies 36, which powered rollers 34 rotate the tube bundle T about its central axis A-A while a cleaning or treating fluid is sprayed thereon from a second HUSKY water jet unit 32'. A splash guard 38 may be provided at this station. Once all maintenance operations are completed the tube bundle T is moved off of the protector 30 back onto the frame structure 10 as illustrated in FIG. 1f, and subsequently is reinserted into the shell S by the frame structure 10 as illustrated in FIG. 1g.

The details of an exemplary protector 30 according to the present invention are illustrated in FIGS. 3 through 6. As shown most clearly in FIGS. 5 and 6, the protector 30 includes a platform 40 having guide structures for the trolley rollers 14 associated therewith, such guide structures preferably being channels 42 corresponding in shape and dimension to the channels 28 of the frame structure 10, and being spaced apart the same distance. The rollers 14 of the trollies 12 can thus roll right off of the channels 28 (with end caps 29 removed) into association with the channels 42. The channels 42 are long enough to support all of the trollies 12 from a frame structure 10 thereon, with the trollies 12 supporting the tube bundle T at spaced positions along the length thereof. Hydraulic or pneumatic power is provided to the trolley cylinders 17 via the umbilicals 44 facilitating transport of the bundle T from a position supported by the trollies 12 to other positions.

The protector 30 also preferably includes an alignment structure for positively aligning the protector 30 with the frame structure 10. The alignment structure preferably comprises a pair of slings 46 mounted on opposite sides of the bottom of the platform 40 and each operatively connected to a sling cylinder 48 or like structure for moving the sling 46. The slings 46 attach the frame structure 10 to the protector 30 so that they are in correct alignment, with the channels 28, 42 coextensive. Once they are properly aligned, the tube bundle, mounted on the trollies 12, is moved onto the protector 30 utilizing the force applying means 24 of the frame structure 10. However in situations where the frame structure with which the protector 30 is utilized is non-powered, or in other situations where it is desirable to move the tube bundle T off of the protector 30 (e.g. as into the automated bundle cleaning system as indicated in FIG. 1d), means for exerting a linear force parallel to the direction of elongation of the guiding structure (channels 42) is provided. In the embodiment illustrated in the drawing this structure comprises the cylinder 50 and a suitable structure for attaching it to the tube bundle.

Where the tube bundle is to be transferred from a non-powered frame structure, a plurality of trollies 12 are actually associated with the protector 30 for facilitating movement of the tube bundle onto the protector 30. The trollies are used in conjunction with the rod 52 which is attached to a central portion of the innermost trolley 12' (see FIGS. 3 and 4) via a pin 53 and gusset 54, the piston rod 55 from the cylinder 50 being operatively connected to a clamping assembly for the trollies, indicated generally at 57 in the drawings.

The clamping assembly 57 comprises means for effecting latching of the trollies 12 onto the platform 40 so that no relative movement therebetween is possible unless the cylinder 50 is operated. The components of the latching means 57 are seen most clearly in the cutaway portion of FIG. 3 and in FIGS. 5 and 6, and include the levers 58 which pivot about pins 59 and abut against a rectangular section of the trolley 12 subframe, indicated at 60 (see FIG. 3 in particular). The levers 58 are positionally biased to the position illustrated in FIG. 3 by the springs 61 so that when power is not applied to the levers 58 they are spring-loaded to the latching position. Movement of the levers 58 to the unlatching position is accomplished by the action of the hydraulic cylinders 62 which operatively act upon the levers 58 (a portion thereof below pivot pins 59) to pivot them into non-latching relationship with the trolley frame portion 60. Control of the cylinders 62 is preferably accomplished by an actuator lever 63 on a control panel 64 or the like, the control lever 63 being associated with a spring-biased hand valve that requires continuous pressure in order to continue to supply fluid to the cylinders 62.

The protector 30 further includes interlock means for preventing disconnection of the alignment structure 46 (that is prevents operation of the cylinders 48) from between the protector 30 and the frame structure 10 until the latching means 57 effect latching of a trolley 12 onto the platform 40. Such interlock means may include any conventional hydraulic interlock arrangement. Also, a valve 66 is in contact with the frame structure 10 when they are in alignment and during transfer of the trollies 12. The valve 66 is operatively connected in the fluid circuitry associated with all of the actuators on the control board 64 so that none of them may be operated unless the actuator for the valve 66 is depressed. The levers on the control board 64 control operation of valves to control the cylinders 50, 17, 19, and 62, the umbilicals 44 providing for the necessary fluid conduits and the like for all fluid circuitry.

Trolley clips 65 (see FIG. 4) are provided on the frame structure of the protector 30. These clips 65 are situated so that when all of the trollies (e.g. four) are disposed between the clips the entire protector assembly is in balance and may be lifted squarely without trial and error.

Means are also provided for facilitating movement of the protector 30 from one maintenance station to another. As illustrated most clearly in FIGS. 3 and 4, such means may take the form of a plurality of spaced structures, such as eyelets 70, for receipt of a cable or the like, and so positioned with respect to each other and the platform 40 that when the platform 40 receives a tube bundle T it may be lifted by a single crane hook operatively connected to cables received by said structures 70 with the platform 40 maintaining a substantially horizontal position. Typically, four eyelets 70 would be provided disposed in pairs opposite each other on different sides of the platform 40, and each pair disposed the same distance from the center of gravity of the protector 30. A crane, engaging cables received by the eyelets 70, may be utilized to move the protector 30 itself from station to station, or alternatively the crane may be utilized to lift the protector 30 onto a low lading trailer, or like structure, which is then used to transport the protector 30 with attached tube bundle T from station to station.

Another form the means for facilitating the movement of platform 30 from one maintenance station to another may take is illustrated in FIG. 5 and includes a plurality of lifting jacks 72 disposed at convenient points around the periphery of the platform 40. When the lifting jacks are activated they are capable of raising the protector 30 platform 30 high enough off the ground such that a low loading trailer may be passed directly underneath it, after which the lifting jacks 72 are deactivated so that the platform 40 is lowered onto the trailer.

Figure 6:
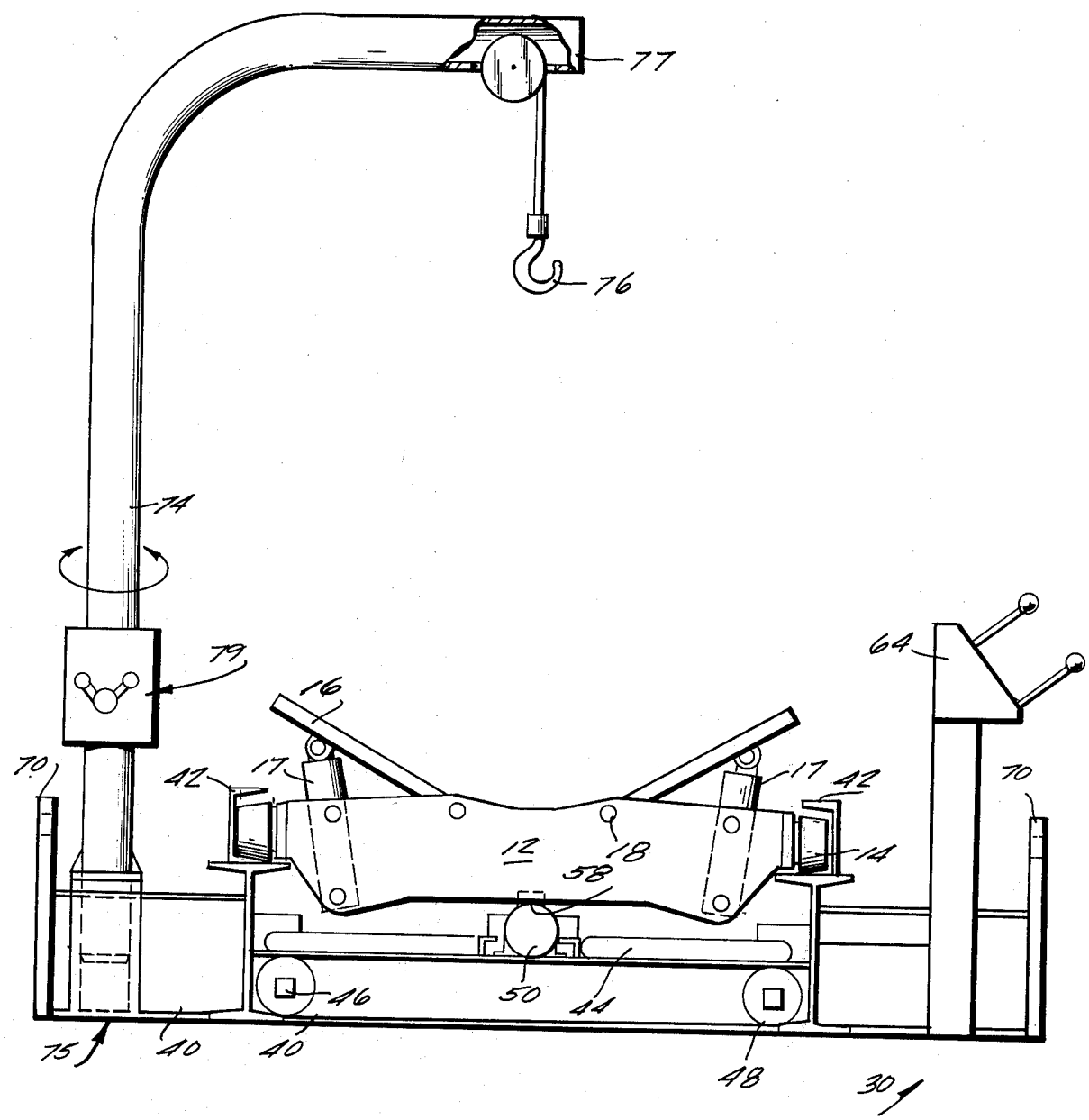
FIG. 6 is an end view of a second exemplary embodiment of a protector apparatus according to the invention.

FIG. 6 illustrates another optional structure that may be provided on the protector 30 according to the present invention. This optional feature comprises a tubular shaft 74 rotatable in a circular bearing 75, with a crane hook 76 mounted at the end 77 of the shaft 74 remote from the bearing 75. The hook 76 may be operated either by hand or by a pneumatic hoist, the operating structure therefore being illustrated at 79 in FIG. 6. When the tube bundle T is transferred from the frame structure 10 to the protector 30, the hook 76 can be used to remove the pulling plate attached to the tube bundle, either on location or in a maintenance bay. Also, the hook 76 can be utilized to attach the pulling plate to a tube bundle T prior to its reinsertion into the shell S.

OPERATION

The following operational sequence may be utilized in practicing the method according to the present invention:

Utilizing the frame structure 10, a tube bundle T is linearly moved out of the heat exchanger shell S onto the frame structure 10 (FIG. 1a). Trollies 12 are provided beneath the tube bundle T at predetermined space points along the length thereof in engagement therewith to support the weight of the tube bundle T. The frame structure with supported tube bundle T is then moved to a supported position wherein the central axis of the tube bundle T is substantially horizontal (FIG. 1b), and the trollies 12 with supported tube bundle T are rolled off the frame structure 10 by moving the tube bundle T horizontally with the rollers 14 of the trollies 12 rolling along a stationary horizontal support (channels 28 and 42). Preferably the tube bundle T is transferred to a protector 30 (FIGS. 1b and 1c).

While still supported by the trollies 12, the tube bundle T is moved to any desired maintenance stations for cleaning and/or repair thereof. Movement of the tube bundle T may be facilitated by lifting of the protector 30 with a crane by attachment of cables to eyelets 70 of the protector 30, and lifting the entire protector 30 so that the platform thereof is supported by a conventional trailer (not shown). Alternatively the jacks 72 may be activated to lift the platform 40 so that a trailer may be wheeled underneath it.

One exemplary maintenance operation performed on the tube bundle T is illustrated schematically in FIG. 1b, wherein a HUSKY water jet unit 32 is utilized to spray water under high pressure onto the tube bundle T to effect cleaning thereof. Another typical maintenance operation is illustrated in FIG. 1d wherein the tube bundle T is moved off of the protector 30 (as by utilizing the main cylinder 50 in conjunction with the trolley latching mechanism 57) into an automated bundle cleaning system. The automated bundle cleaning system illustrated in FIG. 1d may comprise a fabricated structure with a single washing container per bundle and sufficient tanks to handle the volume and variety of cleaning fluids required. Once completely contained within its cell the front of the system is secured and the tube bundle is sealed within a safe washing environment. The tube bundle T can then be subjected to any desired washing/cleaning utilizing chemicals from the various tanks as required. The sealed cell may be emptied and filled with the required fluid quickly, and the entire system may be computer controlled, with safety of all personnel kept at a maximum, the danger of pollution being kept to a minimum, and minimum bundling cleaning time with guaranteed results and limited down time.

FIG. 1e illustrates another typical maintenance station. In order to move the tube bundle T to the position illustrated in FIG. 1e, the protector 30 is aligned with the powered roller 34 trollies 36. A hydraulic umbilical is connected to the protector 30 from the powered rollers 34 and by moving each trolley 12 sequentially the tube bundle is transferred quickly and safely to the powered rollers 34. No slings are required for this transfer, which can be accomplished by an overhead crane or by utilizing the main cylinder 50 and trolley latching mechanism 57. As the tube bundle T is rotated about a horizontal axis at the position illustrated in FIG. 1e, it is sprayed with water or other cleaning fluid from the HUSKY water jet unit 32'.

In all situations where the tube bundle T is to be moved off of or onto the protector (including situations where the tube bundle T is transferred from a non-powered frame structure T), the sequence of operation of the main cylinder 50 and the latching mechanism 57 is as follows: In moving the tube bundle T onto the protector 30, from a position entirely exterior thereof, all of the cylinders 17 are activated so that the leaves 16 are in a lowered position. The rod 52 is then connected by a pin 53 to the "innermost" trolley 12'. The cylinder 50 is activated to move the piston rod 55 thereof so that the latching mechanism is in operative association with the "innermost" trolley 12', and then the cylinder 50 is further actuated so that the trolley 12' is moved along the platform 40, the rollers 14 thereof being received by the channels 42, to a position wherein the last baffle of the tube bundle T is over the second or third trolley 12. Then the cylinders 17 of the such second or third trolley 12 are activated to move the leaves 16 thereof into engagement with that baffle to positively support it. The latching mechanism 57 is then activated to be detached from the trolley 12' and to move into operative association with such second or third trolley and to move it so that the first or second trolley is then in a position to also support the heat exchanger tube bundle. The rod 52 is then removed and the transference continued by gripping each trolley individually with the latching assembly 57 and transporting and utilizing the main cylinder 50.

At the time of transfer of the tube bundle T from the frame structure 10 to the protector 30, the slings 46 are activated by the cylinders 48 to grip the frame structure 10 and align the frame structure 10 with the protector 30. Once the transfer of the tube bundle T is completed, decoupling of the slings 46 with the frame structure 10 is effected after it is ensured that the latching mechanism 57 positively latches one of the trollies 12 in place. Unless one of the trollies is latched in place deactivating operation of the cylinders 48 is not possible.

Once all of the maintenance operations have been completed, the tube bundle T is transferred back to the frame structure 10 as illustrated in FIG. 1f following a reverse sequence to the transfer step described with respect to FIG. 1b, and once the transfer is completed and the protector 30 is decoupled from the frame structure 10, the frame structure 10 reinserts the tube bundle T into the shell S as illustrated schematically in FIG. 1g.

It will thus be seen that according to the present invention complete maintenance operations can be performed on a heat exchanger tube bundle T without the use of slings, and in a simple, effective, and timely manner.

While the invention has been herein illustrated and described in what is presently conceived to be a practical and preferred embodiment thereof, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A method for performing maintenance operations on a heat exchanger tube bundle mounted in a heat exchanger shell utilizing an extracting and inserting apparatus including a frame structure having a plurality of movable trollies supported for movement therewith and for supporting the tube bundle at spaced points along the length thereof, the trollies having rollers disposed on opposite sides of the central axis of the tube bundle, the method comprising the steps of (a) linearly moving the tube bundle to pull it out of the heat exchanger shell onto the frame structure;

(b) providing the trollies beneath the tube bundle at predetermined spaced points along the length thereof and in engagement therewith to support the weight of the tube bundle;

(c) moving the frame structure with supported tube bundle to a supported position wherein the central axis of the tube bundle is substantially horizontal;

(d) rolling the trollies, with supported tube bundle, off of the frame structure by moving the tube bundle horizontally with the trolley rollers rolling along a stationary horizontal support;

(e) moving the tube bundle, while still supported by the trollies, to desired maintenance stations at which maintenance operations are performed on the tube bundle while still supported by the trollies;

(f) rolling the trollies supporting the tube bundle back onto the frame structure while the frame structure is in a horizontal position;

(g) moving the frame structure into operative association with the heat exchanger shell; and (h) linearly moving the tube bundle off of the frame structure into the heat exchanger shell.

2. A method as recited in claim 1 wherein step (d) is practiced by rolling the movable trollies onto a protector, the protector including a platform that is horizontal and having a trolley support structure vertically coincident with a trolley support structure of the frame structure.

3. A method as recited in claims 1 or 2 wherein steps (a)–(h) are performed substantially sequentially.

4. A method as recited in claims 1 or 2 consisting essentially of steps (a)–(h), whereby the tube bundle never is supported by slings.

5. A method as recited in claims 1 or 2 comprising the further step of transferring the tube bundle from the movable trollies, which comprise a first set, to a second set of movable trollies, the movable trollies of the second set effecting rotation of the tube bundle about its central axis.

6. A method as recited in claims 1 or 2 wherein step (e) includes moving the tube bundle to a washing station and spraying washing fluid onto the tube bundle while it is being rotated about its central axis.

7. A method as recited in claim 2 comprising the further step of effecting latching of the movable trollies onto the protector platform so that no relative movement therebetween is possible.

8. A method as recited in claim 7 wherein the protector has alignment structure for aligning the protector with the frame structure, and comprising the further steps of aligning the frame structure and protector just before practicing both steps (d) and (f); and after step (d) and prior to step (e), preventing by positive control interlock, disconnection of the alignment structure from between the protector and the frame structure until the latching step is accomplished.

9. A method as recited in claim 2 wherein step (e) is accomplished in part by transferring the tube bundle while supported by the trollies off of the protector and into an automated cleaning system.

10. A method as recited in claim 5 wherein each trolley of the first set includes a pair of adjustable leaves, and wherein said transferring step is accomplished by selectively adjusting the leaves of each of the trollies of the first set to support or not support the tube bundle.

11. A method as recited in claim 2 wherein step (e) is accomplished by lifting the protector with a crane or the like and moving it from one maintenance station to the other.

12. A method as recited in claim 2 wherein step (e) is accomplished by lifting the protector platform off the ground, disposing a mobile apparatus underneath it, and moving the protector from station to station on the mobile apparatus.

13. A method as recited in claim 5 wherein the protector has a linear force exerting structure associated therewith, and wherein said transferring step is further accomplished by applying a linear force to the tube bundle with the force exerting structure associated with the protector to move the tube bundle off the protector.

14. A method as recited in claim 9 wherein the protector has a linear force exerting structure associated therewith, and wherein said transferring step is further accomplished by applying a linear force to the tube bundle with the force exerting structure associated with the protector to move the tube bundle off the protector.

* * * * *